United States Patent
Clarke et al.

(10) Patent No.: US 6,321,548 B1
(45) Date of Patent: Nov. 27, 2001

(54) APPARATUS FOR AUTOMATICALLY CLOSING A COOLING SYSTEM EXPANSION VALVE IN RESPONSE TO POWER LOSS

(75) Inventors: Raynald C. Clarke; David R. Cornish, both of Lithonia, GA (US)

(73) Assignee: Heatcraft Inc., Grenada, MS (US)

( * ) Notice: Subject to any disclaimer, the term of this patent is extended or adjusted under 35 U.S.C. 154(b) by 0 days.

(21) Appl. No.: 09/540,043

(22) Filed: Mar. 31, 2000

(51) Int. Cl.$^7$ .................................................. F25B 41/04
(52) U.S. Cl. .................................. 62/222; 62/126; 62/230
(58) Field of Search .......................... 62/126, 129, 222, 62/230, 223, 224, 225, 210, 211, 212, 196.2, 199, 527

(56) References Cited

U.S. PATENT DOCUMENTS

| | | | |
|---|---|---|---|
| 4,523,436 | * | 6/1985 | Schedel et al. ........................ 62/222 |
| 4,987,749 | * | 1/1991 | Baier ...................................... 62/222 |
| 5,303,562 | * | 4/1994 | Bahel et al. ........................... 62/222 |
| 5,370,307 | * | 12/1994 | Uehra ..................................... 62/222 |
| 5,396,779 | * | 3/1995 | Voss ...................................... 62/196.2 |
| 5,402,652 | * | 4/1995 | Alsenz ................................... 62/222 |
| 5,630,325 | * | 5/1997 | Bahel et al. ........................... 62/222 |
| 5,701,753 | * | 12/1997 | Iritani .................................... 62/211 |
| 5,704,219 | * | 1/1998 | Suzuki et al. ......................... 62/222 |
| 5,715,704 | * | 2/1998 | Cholkeri et al. ...................... 62/527 |
| 5,732,570 | * | 3/1998 | Tomatsu et al. ...................... 62/527 |
| 5,926,438 | * | 10/1998 | Ohishi et al. ......................... 62/199 |
| 5,934,094 | * | 8/1999 | Itoh et al. ............................. 62/222 |

\* cited by examiner

*Primary Examiner*—Teresa Walberg
*Assistant Examiner*—Fadi H. Dahbour
(74) *Attorney, Agent, or Firm*—W. Kirk McCord

(57) ABSTRACT

In a space cooling system having an evaporator in heat exchange relationship with a space to be cooled, a condenser external to the space, a compressor for circulating heat transfer fluid between the evaporator and condenser, an expansion valve for controlling the flow rate of heat transfer fluid through the evaporator, apparatus for automatically closing the expansion valve in response to a loss of electrical power to the system. The apparatus includes a storage capacitor for storing electrical energy when power is being supplied to the system, a voltage detector for detecting a loss of electrical power and a controller for controlling a step motor to close the expansion valve in response to a loss of system power. The capacitor automatically discharges in response to a power loss condition to supply power to the controller and step motor to enable the expansion valve to be closed. Therefore, refrigerant migration in the system, which can damage the compressor upon restart, is substantially inhibited.

20 Claims, 3 Drawing Sheets

APPARATUS FOR AUTOMATICALLY CLOSING A COOLING SYSTEM EXPANSION VALVE IN RESPONSE TO POWER LOSS

DESCRIPTION

1. Field of Invention

This invention relates generally to cooling systems, such as comfort cooling and refrigeration systems, and in particular to apparatus for closing a refrigerant expansion valve used in such cooling systems in response to a loss of system electrical power.

2. Background Art

Space cooling systems, including both comfort cooling and refrigeration systems, typically include an evaporator in heat exchange relationship with a space to be cooled, a condenser external to the space, a compressor for circulating a heat transfer medium (e.g., a phase change refrigerant) between the evaporator and the condenser, and an expansion valve located between the condenser outlet and the inlet to each evaporator. The expansion valve is positionable at various positions between fully opened and fully closed to regulate the flow rate of the heat transfer medium through the evaporator. An indoor fan is typically included to provide air flow across the evaporator and outdoor fan is provided for cooling the condenser.

In some cooling systems, an electrically operable solenoid valve is located between the condenser outlet and the expansion valve. The solenoid valve typically includes a spring which biases the solenoid valve toward a closed position in the absence of electrical power being supplied to the solenoid valve. In the event of a loss of electrical power to the cooling system, the spring closes the solenoid valve to prevent migration of refrigerant in the system.

In other types of cooling systems, however, there is no solenoid valve to help prevent refrigerant migration after a loss of electrical power. In such cases, the expansion valve will usually remain in the same position as it was when power was lost. Therefore, unless the expansion valve was fully closed at the time that power is lost, refrigerant may migrate in the system through the open expansion valve, which can cause damage to the compressor upon restart when electrical power is restored.

There is therefore a need for an improved apparatus for preventing refrigerant migration in a cooling system when there is a loss of electrical power.

SUMMARY OF INVENTION

In accordance with the present invention, apparatus is provided for automatically closing an electrically operable expansion valve located between an outlet side of a condenser and an inlet side of an evaporator in a cooling system, in response to a substantial loss of electrical power. The apparatus comprises a capacitor coupled to an electrical power source for being charged by the power source, a regulator intermediate the power source and the capacitor for regulating voltage across the capacitor within a predetermined limit, a detector for detecting a substantial loss of electrical power from the power source and for generating an electrical signal indicative thereof, and a controller responsive to the electrical signal for generating a control signal to control an electrically operable device to close the expansion valve. The capacitor is operable to automatically discharge in response to a substantial loss of electrical power to provide electrical power to the controller and to the electrically operable device to close the expansion valve.

In accordance with one embodiment of the invention, the regulator is comprised of a booster power supply for maintaining voltage across the capacitor within the predetermined limit when electrical power is being supplied from the power source. In the preferred embodiment, the booster power supply includes a switching regulator and an inductor for storing electrical current.

In accordance with a feature of the invention, the apparatus includes another regulator for maintaining voltage supplied to the controller within another predetermined limit. The other regulator is intermediate the capacitor and the controller, such that when said capacitor discharges in response to a substantial loss of electrical power from the power source, the other regulator is operative to maintain the voltage input to the controller within the other predetermined limit.

In accordance with another feature of the invention, the apparatus further includes a driver device electrically coupled between the controller and the electrically operable device. The driver device is operative in response to the control signal from the controller to supply power to operate the electrically operable device to close the expansion valve. In the preferred embodiment, the electrically operable device is a step motor, which is operable to open and close the expansion valve in predetermined increments, whereby the expansion valve is positionable in various positions between fully opened and fully closed.

In accordance with the present invention, improved apparatus is provided for automatically closing a cooling system expansion valve in response to a loss of system electrical power without the need for an electrically operable solenoid device. By closing the expansion valve upon loss of system electrical power, refrigerant migration in the system after power loss is substantially inhibited.

BEST MODE FOR CARRYING OUT THE INVENTION

The best mode for carrying out the invention will now be described with reference to the accompanying drawings. Like parts are marked throughout the specification and drawings with the same respective reference numbers. The drawings are not necessarily to scale and proportions may have been exaggerated in order to more clearly depict certain features of the invention.

Figure 1:
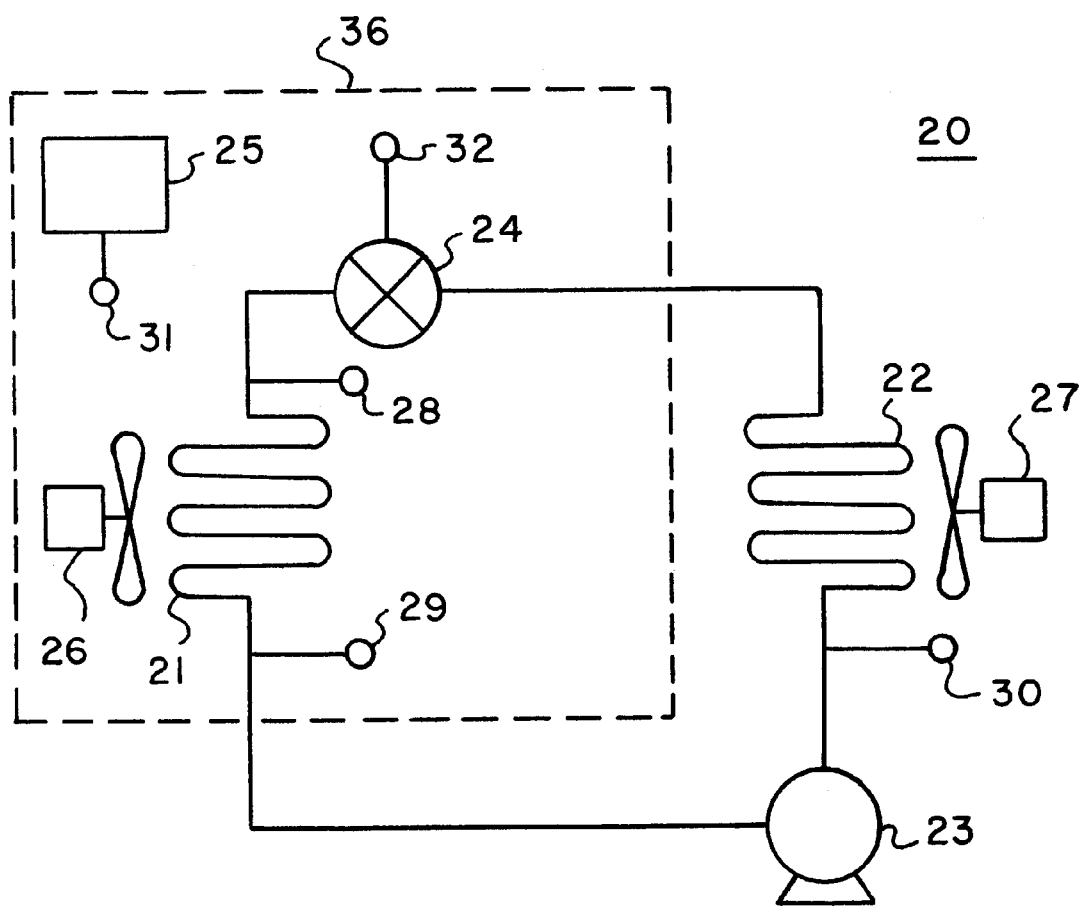
FIG. 1 is a schematic of a space cooling system having a thermal expansion valve which is operable by means of a step motor.

Referring now to FIG. 1, a space cooling system 20 is comprised of an evaporator 21 in heat exchange relationship with an indoor space to be cooled (e.g., a refrigerated compartment), a condenser 22 external to the space, a compressor 23 for circulating heat transfer medium (e.g., a phase change refrigerant) between evaporator 21 and condenser 22, and a thermal expansion valve 24 located between an outlet side of condenser 22 and an inlet side of evaporator 21. A microcomputer-based controller 25 is provided for controlling system 20. Controller 25 is preferably a single-chip microcomputer of the ST6232 type, manufactured and sold by SGS-Thomson Microelectronics. An indoor fan 26 is provided for directing ambient air in the space to be cooled across evaporator 21. An outdoor fan 27 is provided for directing outdoor air, which acts as a cooling medium, across condenser 22. Evaporator 21 and condenser 22 are preferably both heat transfer coils with multiple passes, as shown.

First and second temperature sensors 28, 29 are respectively positioned on inlet and outlet sides of evaporator 21 for measuring evaporator inlet and outlet temperatures, respectively. A third temperature sensor 30 is located on a discharge side of compressor 23 for measuring compressor discharge temperature and a fourth temperature sensor 31 measures the ambient temperature of the space to be cooled. Temperature sensors 28, 29, 30, 31 are preferably thermistors. During normal operation, controller 25 is responsive to various inputs, including inputs from temperature sensors 28, 29, 30, 31 for positioning expansion valve 24 to control the flow rate of refrigerant through evaporator 21 and controlling other aspects of system 20.

Expansion valve 24 is positionable in a fully opened position to allow refrigerant to enter evaporator 21 unimpeded, a fully closed position to substantially inhibit refrigerant from entering evaporator 21 and a plurality of intermediate positions between fully opened and fully closed to regulate the flow rate through evaporator 21. Expansion valve 24 is preferably of the type which is operated by a step motor 32. Expansion valve 24 is adjustable in selected increments to regulate the flow rate of refrigerant through evaporator 21.

Evaporator 21, expansion valve 24, controller 25, indoor fan 26 and temperature sensors 28, 29, 31 are typically housed in an indoor unit 36 of system 20, which is defined by the dashed lines in FIG. 1. Condenser 22, compressor 23 and temperature sensor 30 are typically housed in an outdoor unit of system 20.

Figure 2:
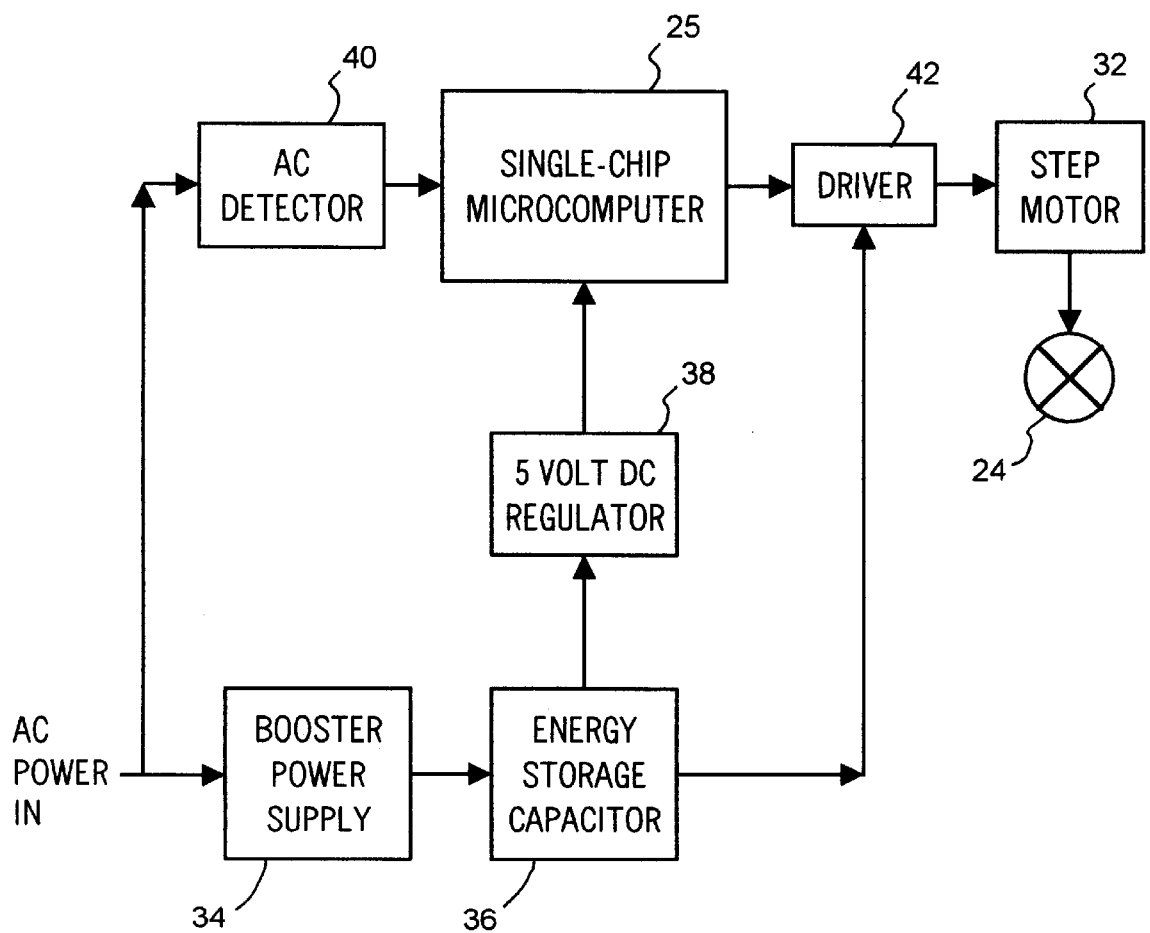
FIG. 2 is a schematic of apparatus for automatically closing the cooling system expansion valve in response to a loss of system electrical power, according to the present invention.
Figure 3:
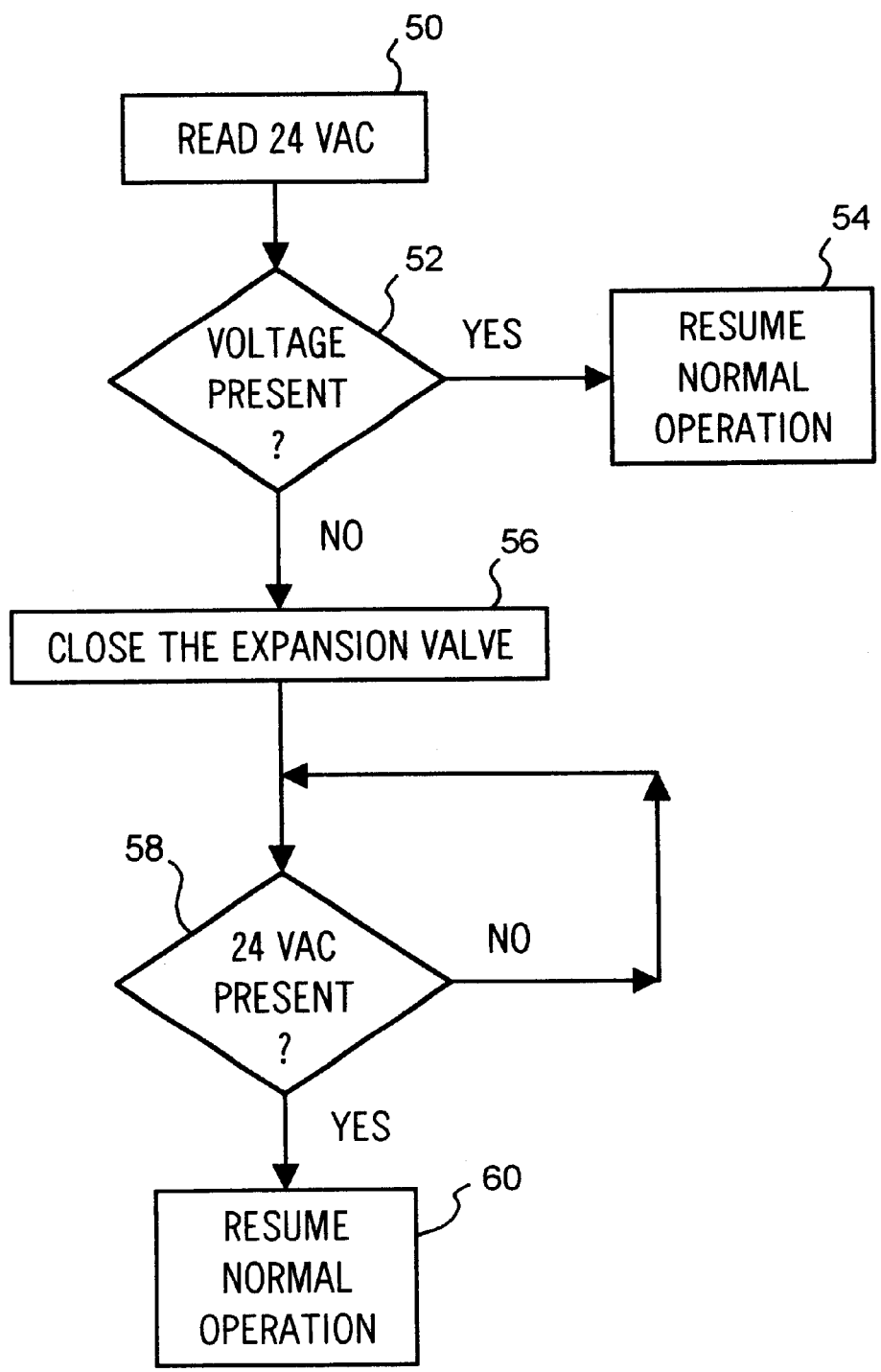
FIG. 3 is a flow diagram showing the sequence of operation of the apparatus of FIG. 2, according to the present invention.

Referring also to FIGS. 2 and 3, apparatus is provided for automatically closing expansion valve 24 in response to a loss of system electrical power. The apparatus is comprised of a booster power supply 34, an energy storage capacitor 36, a voltage regulator 38, a voltage detector 40 and a driver device 42, in addition to controller 25. Booster power supply 34, which preferably includes a switching regulator of the MIC2172BN type, manufactured by Micrel, receives 18–30 volts input from a 24 volt AC power source, rectifies the input voltage and provides a relatively constant DC output at about 34 volts. Booster power supply 34 also includes a 250 uH inductor, which functions as a current storage device when the input voltage sags. The 34 volt DC output from booster power supply 34 maintains a relatively constant 34 volts across storage capacitor 36. Storage capacitor 36 preferably has a capacitance of about 12,000 uF.

Detector 40 continually reads the 24 volt AC input (step 50 in FIG. 3). If the input voltage is above a predetermined level, pursuant to step 52 in FIG. 3, normal operation is resumed (step 54 in FIG. 3). If, however, the input voltage drops below the predetermined voltage, pursuant to step 52 in FIG. 3, a power loss condition is indicated and detector 40 sends a low voltage signal to controller 25 and controller 25 causes expansion valve 24 to be closed, pursuant to step 56 in FIG. 3 Expansion valve 24 remains closed until the 24 volt AC power supply is restored (step 58 in FIG. 3), at which time normal operation is resumed (step 60 in FIG. 3).

In the event of a power loss, it is necessary to provide sufficient electrical power to operate controller 25 and step motor 32 to close expansion valve 24. This power is provided by capacitor 36, which begins discharging in response to failure of booster power supply 34 to provide the 34 volt DC output. The discharge of capacitor 36 supplies 34 volt DC power to voltage regulator 38 and to driver device 42. Regulator 38 converts the 34 volt DC voltage to 5 volt DC to operate controller 25. Controller 25 responds to the low voltage signal from detector 40 by transmitting a four-phase control signal at 5 volts DC to driver device 42. Driver device 42 is preferably a driver chip of the L293D type, manufactured and sold by SGS-Thomson Microelectronics.

Driver device 42 responds to the 5 volt DC control signal from controller 25 by generating a four-phase output signal at about 32 volts DC to operate step motor 32 to close expansion valve 24, whereby refrigerant migration in system 20 is substantially inhibited. When 24 volt AC power supply is restored, detector 40 signals controller 25, which resumes normal control of expansion valve 24 via driver device 42 and step motor 32.

The best mode for carrying out the invention has now been described in detail. Since changes in and/or additions to the above-described best mode can be made without departing from the nature, spirit or scope of the invention, the invention is not to be limited to the aforementioned details, but only by the appended claims and their equivalents.

What is claimed is:

1. A space cooling system having an evaporator in heat exchange relationship with a space to be cooled, a condenser external to the space, a compressor for circulating heat transfer fluid between the evaporator and the condenser, and an expansion valve between an outlet side of the condenser and an inlet side of the evaporator for controlling flow of heat transfer fluid through the evaporator, an electrically operable device for opening and closing the expansion valve, and an electrical power source, apparatus for automatically closing the expansion valve in response to a substantial loss of electrical power from the source, said apparatus comprising:

a capacitor coupled to the electrical power source for being charged by the power source;

a regulator device intermediate the power supply and said capacitor for regulating voltage across said capacitor;

a detector for detecting a substantial loss of electrical power from the power source and for generating an electrical signal indicative thereof; and a controller responsive to said electrical signal for generating a control signal to control the electrically operable device to close the expansion valve, said capacitor being operable to automatically discharge in response to a substantial loss of electrical power to provide electrical power to said controller and to the electrically operable device.

2. Apparatus of claim 1 wherein said regulator device is comprised of a booster power supply for maintaining voltage across said capacitor within a predetermined limit when electrical power is being supplied from the power source.

3. Apparatus of claim 2 wherein said booster power supply includes a switching regulator.

4. Apparatus of claim 3 wherein said booster power supply includes an inductor for storing electrical energy.

5. Apparatus of claim 1 wherein said regulator device is a first regulator, said apparatus further including a second regulator-intermediate said capacitor and said controller, said second regulator being operable to maintain voltage supplied to said controller within a predetermined limit when said capacitor is discharging.

6. Apparatus of claim 1 further including a driver device electrically coupled between said capacitor and the electrically operable device, said driver device being supplied with electrical power from said capacitor when said capacitor is discharging to enable said driver device to operate the electrically operable device to close the expansion valve in response to said control signal.

7. A space cooling system having an evaporator in heat exchange relationship with a space to be cooled, a condenser external to the space, a compressor for circulating heat transfer fluid between the evaporator and the condenser, and an expansion valve between an outlet side of the condenser and an inlet side of the evaporator for controlling flow of heat transfer fluid through the evaporator, and an electrical power source, apparatus for automatically closing the expansion valve in response to a substantial loss of electrical power, said apparatus comprising:

an electrically operable device for opening and closing the expansion valve;

a capacitor coupled to the electrical power source for being charged by the power source;

a regulator device intermediate the power supply and said capacitor for regulating voltage across said capacitor;

a detector for detecting a substantial loss of electrical power from the power source and for generating an electrical signal indicative thereof; and a controller responsive to said electrical signal for generating a control signal to control said electrically operable device to close the expansion valve, said capacitor being operable to automatically discharge in response to a substantial loss of electrical power to provide electrical power to said controller and to said electrically operable device.

8. Apparatus of claim 7 wherein said regulator device is comprised of a booster power supply for maintaining voltage across said capacitor within a predetermined limit when electrical power is being supplied from the power source.

9. Apparatus of claim 8 wherein said booster power supply includes a switching regulator.

10. Apparatus of claim 9 wherein said booster power supply includes an inductor for storing electrical energy.

11. Apparatus of claim 7 wherein said regulator device is a first regulator, said apparatus further including a second regulator intermediate said capacitor and said controller, said second regulator being operable to maintain voltage supplied to said controller within a predetermined limit when said capacitor is discharging.

12. Apparatus of claim 7 further including a driver device electrically coupled between said capacitor and said electrically operable device, said driver device being supplied with electrical power from said capacitor when said capacitor is discharging to enable said driver device to operate said electrically operable device to close the expansion valve in response to said control signal.

13. Apparatus of claim 7 wherein said electrically operable device is a step motor.

14. A space cooling system comprising:

an evaporator in heat exchange relationship with a space to be cooled;

a condenser external to the space;

a compressor for circulating heat transfer fluid between said evaporator and said condenser;

an expansion valve between an outlet side of said condenser and an inlet side of said evaporator, said expansion valve being positionable in at least a fully open position to allow heat transfer fluid to enter said evaporator and a fully closed position to substantially inhibit heat transfer fluid from entering said evaporator;

an electrically operable device for opening and closing said expansion valve;

a capacitor coupled to an electrical power source for being charged by the power source;

a regulator device intermediate the power source and said capacitor for regulating voltage across said capacitor;

a detector for detecting a substantial loss of electrical power from the power source and for generating an electrical signal indicative thereof; and a controller responsive to said electrical signal for generating a control signal to control said electrically operable device to close said expansion valve, said capacitor being operable to automatically discharge in response to a substantial loss of electrical power from the source to provide electrical power to said controller and to said electrically operable device to enable closure of said expansion valve.

15. The system of claim 14 wherein said regulator device is comprised of a booster power supply for maintaining voltage across said capacitor within a predetermined limit when electrical power is being supplied from the power source.

16. The system of claim 15 wherein said booster power supply includes a switching regulator.

17. The system of claim 16 wherein said booster power supply includes an inductor for storing electrical energy.

18. The system of claim 14 wherein said regulator device is a first regulator, said apparatus further including a second regulator intermediate said capacitor and said controller, said second regulator being operable to maintain voltage supplied to said controller within a predetermined limit when said capacitor is discharging.

19. The system of claim 14 further including a driver device electrically coupled between said capacitor and said electrically operable device, said driver device being supplied with electrical power from said capacitor when said capacitor is discharging to enable said driver device to operate said electrically operable device to close said expansion valve in response to said control signal.

20. The system of claim 14 wherein said electrically operable device is a step motor.

* * * * *